US011254434B2

(12) United States Patent
Erhel et al.

(10) Patent No.: US 11,254,434 B2
(45) Date of Patent: Feb. 22, 2022

(54) HEADREST FOR A SEAT

(71) Applicant: BOMBARDIER INC., Dorval (CA)

(72) Inventors: Philippe Erhel, Montréal (CA);
Jerome Vigeant, Montréal (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/978,583

(22) PCT Filed: Mar. 6, 2019

(86) PCT No.: PCT/CA2019/050270
§ 371 (c)(1),
(2) Date: Sep. 4, 2020

(87) PCT Pub. No.: WO2019/169491
PCT Pub. Date: Sep. 12, 2019

(65) Prior Publication Data
US 2021/0024217 A1   Jan. 28, 2021

Related U.S. Application Data

(60) Provisional application No. 62/639,157, filed on Mar. 6, 2018.

(51) Int. Cl.
*B64D 11/06* (2006.01)
*B60N 2/853* (2018.01)

(52) U.S. Cl.
CPC .......... *B64D 11/0642* (2014.12); *B60N 2/853* (2018.02); *B64D 11/064* (2014.12)

(58) Field of Classification Search
CPC .... B64D 11/0642; B64D 11/064; B60N 2/853
See application file for complete search history.

(56) References Cited

U.S. PATENT DOCUMENTS

| 5,622,405 A | 4/1997 | Pitencel |
| 6,511,130 B2 | 1/2003 | Dinkel et al. |

(Continued)

FOREIGN PATENT DOCUMENTS

| DE | 4431109 C1 | 10/1995 | |
| WO | 0105621 A1 | 1/2001 | |
| WO | WO-2009002743 A1 * | 12/2008 | ......... B64D 11/0642 |

OTHER PUBLICATIONS

International Search Report and Written Opinion, PCT/CA2019/050270, dated May 13, 2019.

(Continued)

*Primary Examiner* — Anthony D Barfield
(74) *Attorney, Agent, or Firm* — Norton Rose Fulbright Canada LLP (57) ABSTRACT

A headrest for a seat having a backrest frame and a base. The headrest includes a displacement member mountable to the backrest frame to position a lower end of the displacement member in front of the backrest frame and above the base. The displacement member is displaceable relative to the backrest frame to adjust a height of the headrest. A tilt member extends between a pivot end pivotably mounted to the displacement member at a joint, and a head support end disposed above the pivot end to support a rear portion of the head. The joint defines a pivot axis and is positioned in front of the backrest frame and above the base. The tilt member is pivotable about the pivot axis to displace the head support end toward and away from the displacement member.

18 Claims, 3 Drawing Sheets

(56) References Cited

U.S. PATENT DOCUMENTS

| | | |
|---|---|---|
| 8,342,606 B2 | 1/2013 | Le Texier et al. |
| 8,857,911 B2 | 10/2014 | Aguirre et al. |
| 10,676,002 B2 * | 6/2020 | Milner .................. B60N 2/853 |
| 2010/0038949 A1 | 2/2010 | Liao |
| 2014/0284985 A1 | 9/2014 | Hartlaub |

OTHER PUBLICATIONS

US823792A, Jun. 19, 1906, Kline (6-digit US Patent Number format not accepted by IDS form).

* cited by examiner

HEADREST FOR A SEAT

CROSS-REFERENCE TO RELATED APPLICATIONS

This application is a national phase entry under 35 U.S.C. 371 of international patent application having application number PCT/CA2019/050270 and filed on Mar. 6, 2019, which claims priority to U.S. provisional patent application 62/639,157 filed Mar. 6, 2018, the entire contents of each of which are incorporated by reference herein.

TECHNICAL FIELD

The application relates generally to seats for vehicles and, more particularly, to a headrest for such seats.

BACKGROUND

For some aircraft seats, the headrest must be deployed during take-off and landing for safety reasons, so that the head of the occupant of the seat has a surface against which it can rest in the event of a dynamic flight event. Proper headrest support involves relieving the neck of the occupant of the seat from a portion of the weight of the skull. Although some conventional headrests satisfy the safety requirements for this flight condition when deployed, they can position the head of the occupant in an awkward position which can cause the occupant discomfort.

SUMMARY

In one aspect, there is provided a headrest for a seat having a backrest frame and a base, the headrest comprising: a displacement member mountable to the backrest frame to position a lower end of the displacement member in front of the backrest frame and above the base, the displacement member being displaceable relative to the backrest frame to adjust a height of the headrest with respect to the backrest frame; and a tilt member extending between a pivot end pivotably mounted to the displacement member at a joint, and a head support end disposed above the pivot end to support a rear portion of a head of an occupant of the seat, the joint defining a pivot axis and being positioned in front of the backrest frame and above the base upon the displacement member being mounted to the backrest frame, the tilt member being pivotable about the pivot axis to displace the head support end toward and away from the displacement member.

In an embodiment, the tilt member has a first tilt segment mounted to the joint and extending therefrom to a second tilt segment at the head support end, the second tilt segment extending transversely to the first tilt segment and being displaceable about the pivot axis and positionable underneath the rear portion of the head.

In an embodiment, the first and second tilt segments are connected to define an L shape for the tilt member.

In an embodiment, the displacement member has a front portion with an upright segment positionable in front of the backrest frame and above the base, the upright segment being connected to the tilt member at the joint and extending upward therefrom to a transverse segment extending transversely to the upright segment.

In an embodiment, the upright and transverse segments are connected to define an L shape for the front portion of the displacement member.

In an embodiment, the displacement member has a rear portion with an elongated rod having an upper end mounted to the transverse segment of the front portion to position the rear portion behind the front portion of the displacement member, the elongated rod being displaceable with respect to a sliding bearing mountable to the backrest frame to displace the displacement member relative to the backrest frame.

In an embodiment, the elongated rod is parallel to the upright segment of the front portion of the displacement member.

In an embodiment, at least one of the elongated rod and the upright segment has an orientation parallel to an orientation of the backrest frame upon the displacement member being mounted to the backrest frame.

In an embodiment, the elongated rod and the upright segment are displaceable relative to the backrest frame in a direction being parallel to an orientation of the backrest frame.

In an embodiment, the tilt member is pivotable about the pivot axis through an angular range of about 60°.

In another aspect, there is provided an aircraft passenger seat, comprising: a base and a backrest extending from the base, the backrest having a backrest frame; and a headrest, comprising: a displacement member mounted to the backrest frame, a lower end of the displacement member being positioned in front of the backrest frame and above the base, the displacement member being displaceable relative to the backrest frame to adjust a height of the headrest with respect to the backrest frame; and a tilt member extending between a pivot end pivotably mounted to the displacement member at a joint, and a head support end disposed above the pivot end to support a rear portion of a head of an occupant of the seat, the joint defining a pivot axis and being positioned in front of the backrest frame and above the base, the tilt member being pivotable about the pivot axis to displace the head support end toward and away from the displacement member.

In an embodiment, the tilt member has a first tilt segment mounted to the joint and extending therefrom to a second tilt segment at the head support end, the second tilt segment extending transversely to the first tilt segment and being displaceable about the pivot axis to be positioned underneath the rear portion of the head.

In an embodiment, the first and second tilt segments are connected to define an L shape for the tilt member.

In an embodiment, the displacement member has a front portion with an upright segment positioned in front of the backrest frame and above the base, the upright segment being connected to the tilt member at the joint and extending upward therefrom to a transverse segment extending transversely to the upright segment.

In an embodiment, the upright and transverse segments are connected to define an L shape for the front portion of the displacement member.

In an embodiment, the displacement member has a rear portion with an elongated rod having an upper end mounted to the transverse segment of the front portion, the rear portion being positioned behind the front portion of the displacement member, the elongated rod being displaceable with respect to a sliding bearing mounted to the backrest frame to displace the displacement member relative to the backrest frame.

In an embodiment, the elongated rod is parallel to the upright segment of the front portion of the displacement member.

In an embodiment, at least one of the elongated rod and the upright segment has an orientation parallel to an orientation of the backrest frame.

In an embodiment, the elongated rod and the upright segment are displaceable relative to the backrest frame in a direction being parallel to an orientation of the backrest frame.

In an embodiment, the tilt member is pivotable about the pivot axis through an angular range of about 60°.

In a further aspect, there is provided a method of adjusting a headrest of a seat, the seat having a backrest frame and a base, the method comprising: displacing the headrest with respect to the backrest frame along an axis of displacement; and pivoting an upper end of the headrest toward and away from the backrest frame about a pivot axis defined by a joint at a lower end of the headrest, the joint positioned in front of the backrest frame and above the base.

In an embodiment, the axis of displacement is parallel to an orientation of the backrest frame.

In an embodiment, the axis of displacement is positioned behind the backrest frame.

DESCRIPTION OF THE DRAWINGS

Reference is now made to the accompanying figures in which.

DETAILED DESCRIPTION

Figure 1:
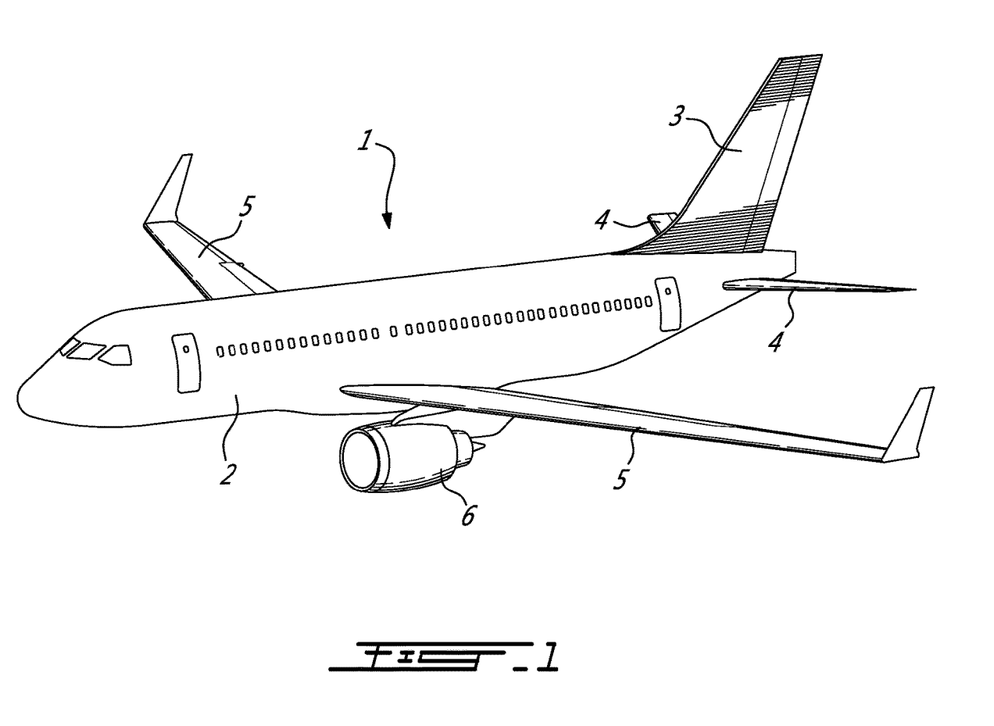
FIG. 1 is a schematic tridimensional view of an aircraft.

Referring to the drawings and more particularly to FIG. 1, an aircraft is shown at 1 and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft. It is also understood that although FIG. 1 shows a commercial aircraft, the aircraft 1 may alternately be any other type of aircraft, including, but not limited to, a business aircraft or a private aircraft.

Figure 2:
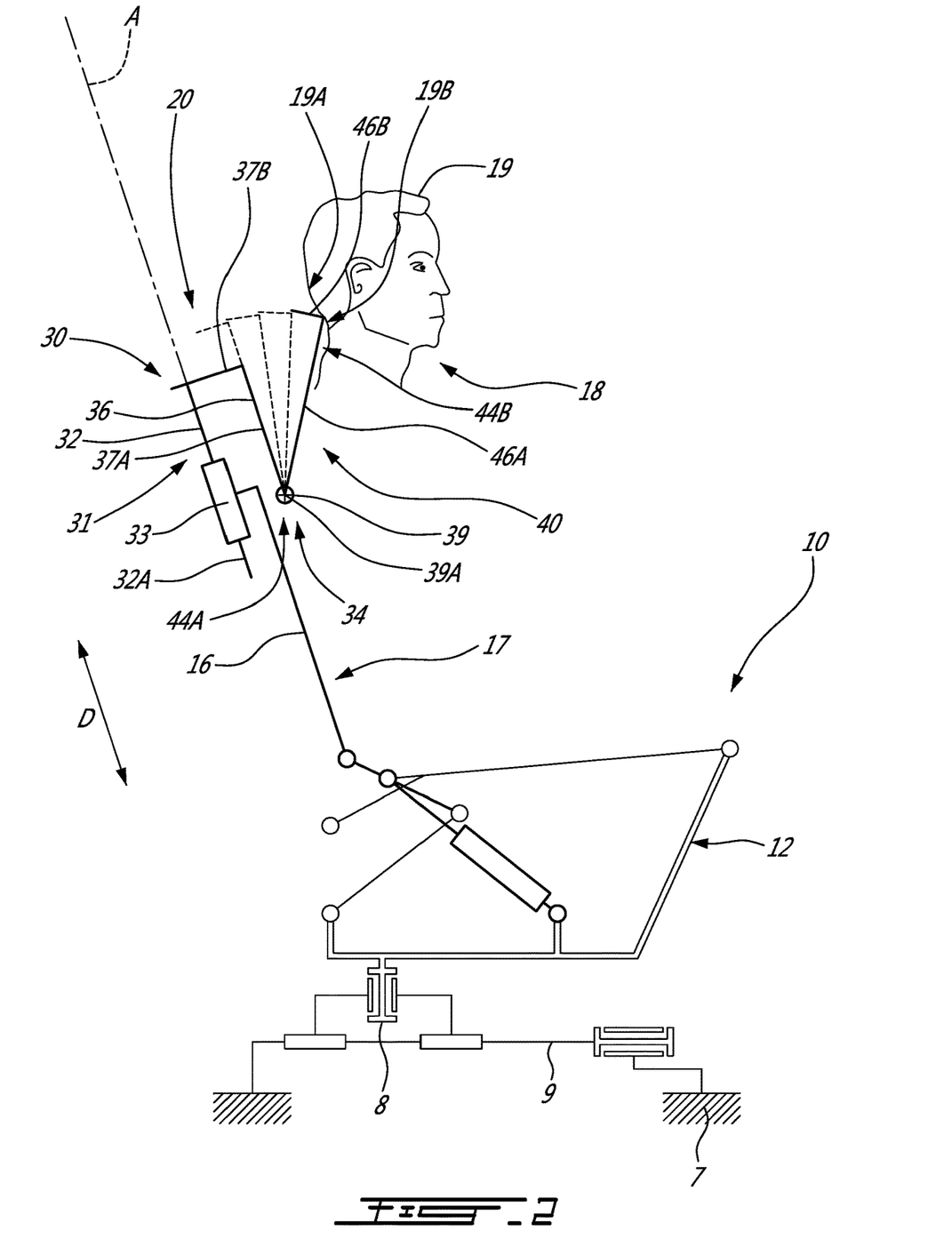
FIG. 2 is a schematic diagram of the structure of a seat which can be used in an aircraft such as shown in FIG. 1, in accordance with an embodiment of the present disclosure.

Referring to FIG. 2, a passenger seat 10 in accordance with an embodiment of the present disclosure is shown. The passenger seat 10 is configured to be used, for example, in the cabin of an aircraft 1 such as shown in FIG. 1. In an embodiment, the seat 10 is mounted to the floor structure 7 in order to position an occupant 18 of the seat 10 in an aft-facing direction. By "aft-facing", it is understood that the seat 10 is mounted in the fuselage 2 such that the front end of the seat 10 is oriented toward the aft end of the aircraft 1 which supports the tail assembly. In an alternate embodiment, the seat 10 is mounted in the fuselage 2 such that the front end of the seat 10 is oriented toward the fore end of the aircraft 1 at which the cockpit is located. The passenger seat 10 could alternately be any other suitable type of aircraft seat, or be used in any other suitable type of vehicle.

The seat 10 includes a carrier or base 12 which is configured to be connected to a floor structure 7, for example to floor beams interconnected to the fuselage 2. In the embodiment shown, the base 12 is connected to a pivot 8 which is slidingly received on rails 9 attached to the floor structure 7, allowing the base 12 to be displaced along a limited path defined by the rails 9 and pivoted about the pivot 8. The pivot 8 is located toward the rear of the base 12, such that a greater part of the base 12 is located in front of the pivot 8. It is however understood that the attachment between the base 12 and floor structure 7 shown here is exemplary only and that any other suitable type of attachment may alternately be used, including, but not limited to, pivoting attachments, sliding attachments, and fixed attachments. The seat 10 includes an internal backrest frame 16 supporting a backrest 17. It is understood that the base 12 and backrest frame 16 may include any material suitable for providing appropriate support and comfort to an occupant 18 of the seat 10, including, but not limited to, suitable cushioning materials which will not be further described herein.

Still referring to FIG. 2, the seat 10 has a headrest 20 which is engaged to the backrest frame 16. The headrest 20 displaces and pivots so that its position can be adjusted to accommodate a head 19 of the occupant 18. To achieve such functionality, the headrest 20 has a displacement member 30 and a tilt member 40, both of which are now described in greater detail below.

The components of the displacement member 30 are manipulated to change a position and distance of the headrest 20 with respect to the backrest 17 and backrest frame 16, in order to position the headrest 20 in the location desired by the occupant 18. When the backrest frame 16 has an upright orientation, the displacement member 30 allows the height of the headrest 20 to be varied. When the seat 10 is reclined and the backrest frame 16 has a horizontal orientation, the displacement member 30 allows a horizontal position of the headrest 20 with respect to an end of the backrest frame 16 to be varied. It will therefore be appreciated that the terms "height", "upper", "lower", etc. used herein merely denote the relative position of components of the seat 10 when it has an upright orientation, but do not limit the seat 10 to only having an upright orientation. The displacement member 30 has internal components, described in greater detail below, which help the displacement member 30 to achieve the functionality ascribed to it herein.

A lower end 34 of the displacement member 30 is positioned in front of the backrest frame 16 and above the base 12. In the depicted embodiment, the lower end 34 is the lowermost and forwardmost extremity of the displacement member 30. The lower end 34 of the displacement member 30 is the portion of the displacement member 30 that is positioned closest to the base 12. The expressions "forward", "behind", and "in front of" are positional descriptors used herein to define the relative location of a component of the seat 10 with respect to other components of the seat 10, where the surface of the backrest 17 in contact with the occupant 18 is considered to be a front surface, and where the surface of the backrest 17 facing away from the occupant 18 is considered to be a rear surface. It is however understood that depending on the orientation of the seat 10 within the aircraft 1, the front surface of the backrest 17 may be facing toward a front, a rear, a side, etc. of the aircraft 1.

The displacement member 30 and its lower end 34 are displaceable relative to the backrest frame 16 to adjust a position (e.g. height) of the headrest 20 with respect to the backrest frame 16. The displacement member 30 therefore allows the position of the headrest 20 with respect to the backrest frame 16 to be varied. The displacement member 30 allows the headrest 20 to be displaced relative to the backrest frame 16 along an axis of displacement A. In the depicted embodiment, the axis of displacement A is a linear axis. In an alternate embodiment, some or all of the axis of displacement A is curved.

Still referring to FIG. 2, the components of the tilt member 40 are manipulable to change a position and an orientation of the tilt member 40 with respect to the backrest 17 and backrest frame 16, to thereby position the headrest 20 in the location and orientation desired by the occupant 18.

The tilt member 40 is disposed in front of the backrest frame 16 and above the base 12. The tilt member 40 is an elongated body extending a length between a lower pivot end 44A and an opposite, upper head support end 44B. The lower pivot end 44A is pivotably mounted to the lower end 34 of the displacement member 30 at a joint 39 such that the tilt member 40 is pivotable about a pivot axis 39A defined by the joint 39 with respect to the displacement member 30. In the depicted embodiment, the tilt member 40 is pivotable about the pivot axis 39A through an angular range of about 60°, as shown by phantom representations of the tilt member 40 in FIG. 2. Other angular ranges are within the scope of the present disclosure. The mounting of the tilt member 40 to the lower end 34 of the displacement member 30 allows the tilt member 40 to displace with the displacement member 30 relative to the backrest frame 16.

The head support end 44B of the tilt member 40 is an upper portion of the tilt member 40, and is positionable adjacent to a rear portion 19A of the head 19 of the occupant 18 in order to support the head 19. More particularly, the tilt member 40 is pivotable about the pivot axis 39A to displace the head support end 44B toward and away from the displacement member 30. This pivotable displacement of the tilt member 40 changes the orientation, or tilt, of a padded surface of the tilt member 40 such that the surface abuts against the rear portion 19A of the head 19. In the depicted embodiment, the head support end 44B is configured to be positioned underneath the rear portion 19A of the head 19, and thus helps to support an occipital region 19B of the head 19. The support provided by the head support end 44B may help to reduce at least some of the weight of the head 19 supported by the neck of the occupant 18, thereby relieving the neck and improving the comfort of the occupant 18.

In the depicted embodiment, the joint 39 is a physical or structural member, and forms the structural body which allows the tilt member 40 to pivot about the pivot axis 39A. The joint 39 may form part of the displacement member 30 or the tilt member 40, or may be a component that is separate from both. In the depicted embodiment, the joint 39 includes a revolute joint. The term "revolute joint" refers to a pivot connection between two members which allows relative pivoting motion between the two members about an axis of rotation without allowing relative translation between the two members, i.e. the axis of rotation has a fixed location with respect to each of the two members. Examples of revolute joints include, but are not limited to, a hinge joint, a pin joint, and a folding joint. Any suitable device may be used to form the joint 39, and some non-limiting examples of such devices include a hinge, a bearing, and an axle. In the depicted embodiment, the joint 39 defines a real or true pivot point. The joint 39 is positioned in front of the backrest frame 16 and above the base 12. This positioning of the joint 39 helps to pivot the tilt member 40 forward and away from the displacement member 30. In the depicted embodiment, the joint 39 displaces with the displacement member 30 relative to the backrest frame 16.

It will be appreciated that by positioning the joint 39 adjacent to the lower pivot end 44A of the tilt member 40 and opposite to the higher head support end 44B, it is easier for the occupant 18 to pivot the head support end 44B into position to support the rear portion 19A of the head 19. The headrest 20 therefore, when deployed such as in FIG. 2, supports the occipital region 19B of the head 19 of the occupant 18. The head support end 44B is also pivotable about the pivot axis 39A to be positioned against the nape of the neck of the occupant 18. The headrest 20 disclosed herein therefore provides for tilting functionality and for translational displacement with respect to the backrest 17. The tilting and displacing functionality of the headrest 20 disclosed herein helps it to support the heads 19 of occupants 18 of various heights and head shapes.

It will be appreciated that many structural configurations of the displacement member 30 and the tilt member 40 are possible to achieve the functionality ascribed to them herein. One such structural configuration is now described with reference to FIG. 2.

The displacement member 30 has an internal frame 31 which has frame members. More particularly, the frame 31 has a rear portion 32 and a front portion 36. The rear portion 32 is mounted to the backrest frame 16. In the depicted embodiment, the rear portion 32 is positioned behind the backrest frame 16 and is thus partially concealed from view thereby. The position of the rear portion 32 with respect to the backrest frame 16 may vary. For example, in an alternate embodiment, the rear portion 32 is mounted in line with the backrest frame 16 and lies in the same plane as the backrest frame 16.

The rear portion 32 includes an elongated rod 32A mounted within, and displaceable relative to, a sliding bearing 33. The sliding bearing 33 is mounted to the backrest frame 16 behind the backrest frame 16, and remains stationary relative thereto while the elongated rod 32A slides through the sliding bearing 33. The position of the elongated rod 32A can be secured with a suitable locking mechanism actionable directly or indirectly by the occupant 18. Sliding or translational displacement of the elongated rod 32A with respect to the sliding bearing 33 causes the displacement member 30 to slidingly displace relative to the backrest frame 16 and parallel to the axis of displacement A.

The front portion 36 has an "L" shape. The front portion 36 has an upright segment 37A connected to the tilt member 40 at the joint 39. The upright segment 37A extends upwardly from the joint 39 to a transverse segment 37B at an upper extremity of the front portion 36. The transverse segment 37B is connected to an upper end of the elongated rod 32A of the rear portion 32, such that displacement of the elongated rod 32A causes the front portion 36 to also displace parallel to the axis of displacement A. The transverse segment 37B extends transversely to the upright segment 37A of the front portion 36 to form the "L" shape of the front portion 36. In the depicted embodiment, the transverse segment 37B is normal to the upright segment 37A.

The L-shaped configuration of the front portion 36 helps to position it in front of the rear portion 32. In the depicted embodiment, the position of the front portion 36 is fixed with respect to the rear portion 32. Therefore, no relative movement is possible between the rear and front portions 32, 36. The front portion 36 therefore conceals or shields the rear portion 32 from view by the occupant 18 when the headrest 20 is displaced relative to the backrest frame 16. As a result, the rear portion 32 may not need to be cushioned or padded because it is not visible or accessible by the occupant 18. The front portion 36 may have other shapes, and is not limited to the L-shaped configuration described. In an alternate embodiment, the front portion 36 is a single linear member which extends from an upper extremity of the elongated rod 32A to a lower extremity at the joint 39 in front of the backrest frame 16 and above the base 12.

In the embodiment of FIG. 2, the tilt member 40 also has an "L" shape, such that the tilt member 40 and the front portion 36 together provide the headrest 20 with a "double L" configuration. The tilt member 40 has a first tilt segment 46A and a second tilt segment 46B which are attached together to form an "L" shape. The first tilt segment 46A is pivotably mounted to the joint 39, and extends upwardly from the joint 39 to the second tilt segment 46B at the upper head support end 44B. The second tilt segment 46B extends transversely to the first tilt segment 46A. In the depicted embodiment, the second tilt segment 46B is normal to the first tilt segment 46A, and defines a linear member for supporting the rear portion 19A of the head 19. More particularly, the second tilt segment 46B is pivotable about the pivot axis 39A to be positioned underneath the rear portion 19A of the head 19. The L-shaped configuration of the tilt member 40 shown in FIG. 2 allows the tilt member 40 to support the rear portion 19A of the head 19 while efficiently making use of the limited space in front of the backrest frame 16.

The tilt member 40 and the front portion 36 therefore form complementary L-shapes. This allows the first tilt segment 46A of the L-shaped tilt member 40 to be pivoted about the pivot axis 39A such that it is parallel to the upright segment 37A of the L-shaped front portion 36. Pivoting the L-shaped tilt member 40 in this manner will also position the second tilt segment 46B of the tilt member 40 parallel to the transverse segment 37B of the L-shaped front portion 36. This configuration helps the tilt member 40 to efficiently use the limited space in front of the backrest frame 16 between the backrest 17 and the occupant 18 when the occupant 18 is seated in the seat 10.

The positioning of the tilt member 40 in front of the front portion 36 conceals or shields the front portion 36 (and the rear portion 32) from view by the occupant 18 when the tilt member 40 is pivoted about the pivot axis 39A. As a result, the front portion 36 may not need to be cushioned or padded because it is not visible or accessible by the occupant 18. In an embodiment, the tilt member 40 is the only component of the headrest 20 that has cushioning or padding. It is therefore understood that some or all of the components of the tilt member 40 may include any material suitable for providing appropriate support and comfort to the occupant 18, including, but not limited to, suitable cushioning materials which will not be further described herein.

Still referring to FIG. 2, the elongated rod 32A is parallel to the upright segment 37A of the front portion 36 of the displacement member. Both the elongated rod 32A and the upright segment 37A have an orientation parallel to an orientation of the backrest frame 16. This parallel orientation allows the elongated rod 32A and the upright segment 37A to be displaced relative to the backrest frame 16 in a direction that is substantially parallel to the orientation of the backrest frame 16, and parallel to the axis of displacement A. Therefore, in the depicted embodiment, the deployment of the headrest 20 occurs in the same direction as the orientation of the structural members of the backrest 17. The deployment of the headrest 20 may occur in a different direction from the orientation of the structural members of the backrest 17. In an alternate embodiment, the elongated rod 32A is transverse to the upright segment 37A of the front portion 36, and either one or both of the elongated rod 32A and the upright segment 37A are transverse to the backrest frame 16. In this embodiment, the displacement of the elongated rod 32A and/or the upright segment 37A relative to the backrest frame 16 is in a direction that is substantially transverse or non-parallel to the orientation of the backrest frame 16. Stated differently, the axis of displacement A is not parallel to the backrest frame 16.

Figure 3A:
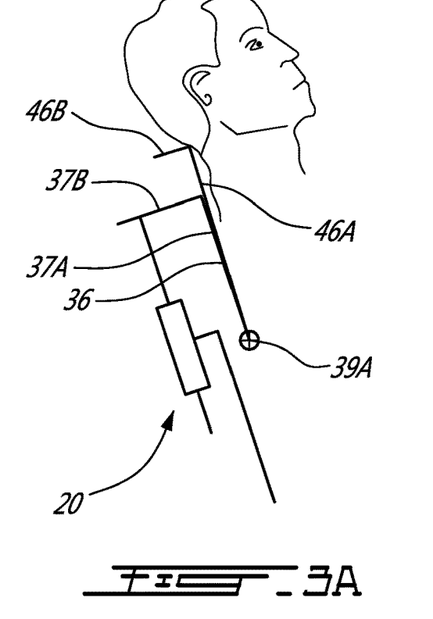
FIG. 3A is a schematic diagram of the structure of a headrest of the seat shown in FIG. 2, the headrest shown in a first position.
Figure 3B:
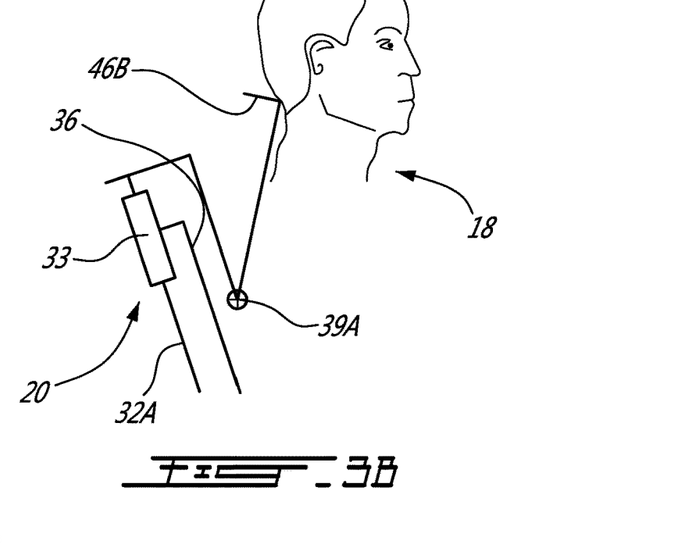
FIG. 3B is a schematic diagram of the structure of the headrest of FIG. 3A, the headrest shown in a second position different from the first position.
Figure 3C:
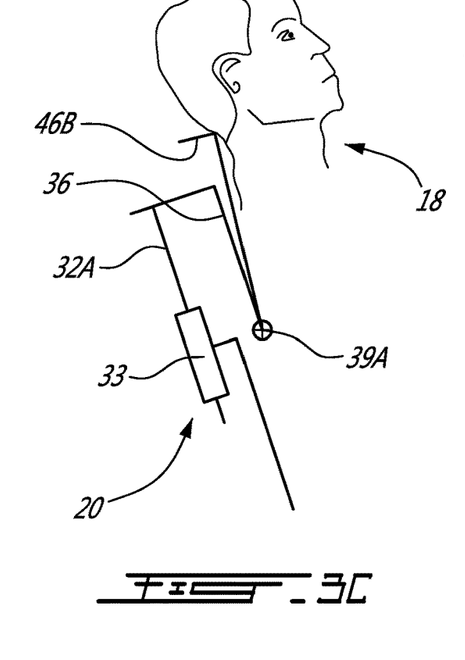
FIG. 3C is a schematic diagram of the structure of the headrest of FIG. 3A, the headrest shown in a third position different from both the first and second positions.

Some of the deployed positions of the headrest 20 are shown in FIGS. 3A to 3C. It will be appreciated that the headrest 20 can be deployed in other positions as well.

In FIG. 3A, the tilt member 40 is pivoted about the pivot axis 39A such that the first tilt segment 46A of the L-shaped tilt member 40 is substantially parallel to the upright segment 37A of the L-shaped front portion 36. The second tilt segment 46B of the tilt member 40 is also substantially parallel to the transverse segment 37B of the L-shaped front portion 36.

In FIG. 3B, the occupant 18 has manipulated the sliding bearing 33 to lower the headrest 20. More particularly, the position of the elongated rod 32A is lowered such that more of the length of the elongated rod 32A is beneath the sliding bearing 33 than above the sliding bearing 33. This lowering of the elongated rod 32A also lowers the front portion 36 and the tilt member 40, in order to accommodate a shorter occupant 18, for example. The tilt member 40 in FIG. 3B is pivoted about the pivot axis 39A such that the second tilt segment 46B of the tilt member 40 is located further away from the front portion 36 than it is in FIG. 3A.

In FIG. 3C, the occupant 18 has manipulated the sliding bearing 33 to raise the headrest 20. More particularly, the position of the elongated rod 32A is raised such that more of the length of the elongated rod 32A is above the sliding bearing 33 than below the sliding bearing 33. This raising of the elongated rod 32A also raises the front portion 36 and the tilt member 40, in order to accommodate a taller occupant 18, for example. The tilt member 40 in FIG. 3C is pivoted about the pivot axis 39A such that the second tilt segment 46B of the tilt member 40 is located closer to the front portion 36 than it is in FIG. 3B.

Referring to FIG. 2, there is also disclosed a method of adjusting the headrest 20. The method includes displacing the headrest 20 with respect to the backrest frame 16 along the axis of displacement A. The method includes pivoting an upper end of the headrest 20 toward and away from the backrest frame 16 about the pivot axis 39A defined by the joint 39, which is positioned at the lower end 34 of the headrest 20 in front of the backrest frame 16 and above the base 12.

Embodiments disclosed herein include:

A. A headrest for a seat having a backrest frame and a base, the headrest comprising: a displacement member mountable to the backrest frame to position a lower end of the displacement member in front of the backrest frame and above the base, the displacement member being displaceable relative to the backrest frame to adjust a height of the headrest with respect to the backrest frame; and a tilt member extending between a pivot end pivotably mounted to the displacement member at a joint, and a head support end disposed above the pivot end to support a rear portion of a head of an occupant of the seat, the joint defining a pivot axis and being positioned in front of the backrest frame and above the base upon the displacement member being mounted to the backrest frame, the tilt member being pivotable about the pivot axis to displace the head support end toward and away from the displacement member.

B. An aircraft passenger seat, comprising: a base and a backrest extending from the base, the backrest having a backrest frame; and a headrest, comprising: a displacement member mounted to the backrest frame, a lower end of the displacement member being positioned in front of the backrest frame and above the base, the displacement member being displaceable relative to the backrest frame to adjust a height of the headrest with respect to the backrest frame; and a tilt member extending between a pivot end pivotably mounted to the displacement member at a joint, and a head support end disposed above the pivot end to support a rear portion of a head of an occupant of the seat, the joint defining a pivot axis and being positioned in front of the backrest frame and above the base, the tilt member being pivotable about the pivot axis to displace the head support end toward and away from the displacement member.

C. A method of adjusting a headrest of a seat, the seat having a backrest frame and a base, the method comprising: displacing the headrest with respect to the backrest frame along an axis of displacement; and pivoting an upper end of the headrest toward and away from the backrest frame about a pivot axis defined by a joint at a lower end of the headrest, the joint positioned in front of the backrest frame and above the base.

Each of the embodiments, A, B and C may have one or more of the following additional elements in any combination.

Element 1: the tilt member has a first tilt segment mounted to the joint and extending therefrom to a second tilt segment at the head support end, the second tilt segment extending transversely to the first tilt segment and being displaceable about the pivot axis and positionable underneath the rear portion of the head.

Element 2: the first and second tilt segments are connected to define an L shape for the tilt member.

Element 3: the displacement member has a front portion with an upright segment positionable in front of the backrest frame and above the base, the upright segment being connected to the tilt member at the joint and extending upward therefrom to a transverse segment extending transversely to the upright segment.

Element 4: the upright and transverse segments are connected to define an L shape for the front portion of the displacement member.

Element 5: the displacement member has a rear portion with an elongated rod having an upper end mounted to the transverse segment of the front portion to position the rear portion behind the front portion of the displacement member, the elongated rod being displaceable with respect to a sliding bearing mountable to the backrest frame to displace the displacement member relative to the backrest frame.

Element 6: the elongated rod is parallel to the upright segment of the front portion of the displacement member.

Element 7: at least one of the elongated rod and the upright segment has an orientation parallel to an orientation of the backrest frame upon the displacement member being mounted to the backrest frame.

Element 8: the elongated rod and the upright segment are displaceable relative to the backrest frame in a direction being parallel to an orientation of the backrest frame.

Element 9: the tilt member is pivotable about the pivot axis through an angular range of about 60°.

Element 10: at least one of the elongated rod and the upright segment has an orientation parallel to an orientation of the backrest frame.

Element 11: the axis of displacement is parallel to an orientation of the backrest frame.

Element 12: the axis of displacement is positioned behind the backrest frame.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A headrest for a seat having a backrest frame and a base, the headrest comprising:
   a displacement member mountable to the backrest frame and having a front portion with an upright segment extending upwardly from a lower end of the displacement member to a transverse segment extending transversely to the upright segment, the upright segment positionable in front of the backrest frame and above the base, the displacement member being displaceable relative to the backrest frame to adjust a height of the headrest with respect to the backrest frame; and
   a tilt member extending between a pivot end pivotably mounted to the upright segment at a joint, and a head support end disposed above the pivot end to support a rear portion of a head of an occupant of the seat, the joint defining a pivot axis and being positioned in front of the backrest frame and above the base upon the displacement member being mounted to the backrest frame, the tilt member being pivotable about the pivot axis to displace the head support end toward and away from the displacement member.

2. The headrest as defined in claim 1, wherein the tilt member has a first tilt segment mounted to the joint and extending therefrom to a second tilt segment at the head support end, the second tilt segment extending transversely to the first tilt segment and being displaceable about the pivot axis and positionable underneath the rear portion of the head.

3. The headrest as defined in claim 2, wherein the first and second tilt segments are connected to define an L shape for the tilt member.

4. The headrest as defined in claim 1, wherein the upright and transverse segments are connected to define an L shape for the front portion of the displacement member.

5. The headrest as defined in claim 1, wherein the displacement member has a rear portion with an elongated rod having an upper end mounted to the transverse segment of the front portion to position the rear portion behind the front portion of the displacement member, the elongated rod being displaceable with respect to a sliding bearing mountable to the backrest frame to displace the displacement member relative to the backrest frame.

6. The headrest as defined in claim 5, wherein the elongated rod is parallel to the upright segment of the front portion of the displacement member.

7. The headrest as defined in claim 5, wherein at least one of the elongated rod and the upright segment has an orientation parallel to an orientation of the backrest frame upon the displacement member being mounted to the backrest frame.

8. The headrest as defined in claim 5, wherein the elongated rod and the upright segment are displaceable relative to the backrest frame in a direction being parallel to an orientation of the backrest frame.

9. The headrest as defined in claim 1, wherein the tilt member is pivotable about the pivot axis through an angular range of about 60°.

10. An aircraft passenger seat, comprising:
   a base and a backrest extending from the base, the backrest having a backrest frame; and
   a headrest, comprising:
      a displacement member mounted to the backrest frame and having a front portion with an upright segment extending upwardly from a lower end of the displacement member to a transverse segment extending transversely to the upright segment, the upright segment positioned in front of the backrest frame and above the base, the displacement member being displaceable relative to the backrest frame to adjust a height of the headrest with respect to the backrest frame; and
      a tilt member extending between a pivot end pivotably mounted to the upright segment at a joint, and a head support end disposed above the pivot end to support a rear portion of a head of an occupant of the seat, the joint defining a pivot axis and being positioned in front of the backrest frame and above the base, the tilt member being pivotable about the pivot axis to displace the head support end toward and away from the displacement member.

11. The aircraft passenger seat as defined in claim 10, wherein the tilt member has a first tilt segment mounted to the joint and extending therefrom to a second tilt segment at the head support end, the second tilt segment extending transversely to the first tilt segment and being displaceable about the pivot axis to be positioned underneath the rear portion of the head.

12. The aircraft passenger seat as defined in claim 11, wherein the first and second tilt segments are connected to define an L shape for the tilt member.

13. The aircraft passenger seat as defined in claim 10, wherein the upright and transverse segments are connected to define an L shape for the front portion of the displacement member.

14. The aircraft passenger seat as defined in claim 10, wherein the displacement member has a rear portion with an elongated rod having an upper end mounted to the transverse segment of the front portion, the rear portion being positioned behind the front portion of the displacement member, the elongated rod being displaceable with respect to a sliding bearing mounted to the backrest frame to displace the displacement member relative to the backrest frame.

15. The aircraft passenger seat as defined in claim 14, wherein the elongated rod is parallel to the upright segment of the front portion of the displacement member.

16. The aircraft passenger seat as defined in claim 14, wherein at least one of the elongated rod and the upright segment has an orientation parallel to an orientation of the backrest frame.

17. The aircraft passenger seat as defined in claim 14, wherein the elongated rod and the upright segment are displaceable relative to the backrest frame in a direction being parallel to an orientation of the backrest frame.

18. The aircraft passenger seat as defined in claim 10, wherein the tilt member is pivotable about the pivot axis through an angular range of about 60°.

\* \* \* \* \*